United States Patent Office 3,346,599
Patented Oct. 10, 1967

3,346,599
DERIVATIVES OF FURAN
James R. Michael, Roselle, Ralph J. Leary and Perry A. Argabright, Cranford, and Anthony J. Passannante, Metuchen, N.J., assignors to Esso Research and Engineering Company, a corporation of Delaware
No Drawing. Filed Dec. 21, 1960, Ser. No. 77,465
9 Claims. (Cl. 260—347.3)

This invention relates to $NF_2$ adducts of bifunctional derivatives of furan and synthesis of these adducts as products.

Products herein described are synthesized to contain a high proportion of $NF_2$ groups, which make them useful as high-energy rocket propellant fuel oxidizers. They contain two functional groups which make them capable of condensation polymerization for yielding a higher molecular weight oxidizer compound or oxidizer binder.

The functional groups substituted for two hydrogen atoms in the furan molecule are, in general, typified by a group containing a carbon atom linked by a double bond to a hetero atom, oxygen, nitrogen, or both, as in the following:

$$-\overset{O}{\underset{\|}{C}}-OCH_3 \quad \text{Carbomethoxy}$$
$$-\overset{O}{\underset{\|}{C}}-OH \quad \text{Carboxy}$$
$$-\overset{O}{\underset{\|}{C}}-Cl \quad \text{Carbonyl chloride}$$
$$-\overset{O}{\underset{\|}{C}}-H \quad \text{Formyl}$$
$$-N=C=O \quad \text{Isocyano}$$
$$-C\equiv N \quad \text{Cyano}$$

The present invention presents the finding that tetrafluorohydrazine, $N_2F_4$, can be added to the bifunctional substituted furans to yield tetrakis $(NF_2)$ adducts, such as,

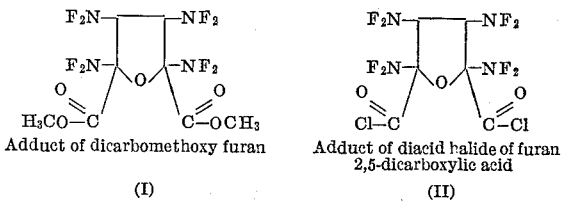

Adduct of dicarbomethoxy furan (I)   Adduct of diacid halide of furan 2,5-dicarboxylic acid (II)

The reaction of the bifunctional furan derivative with $N_2F_4$ has been found to differ in certain respects from the reaction of the monofunctional derivatives with $N_2F_4$, especially in the requirement of higher pressure (superatmospheric) and the aid of a solvent such as $CCl_4$, to make $N_2F_4$ add sufficiently for complete saturation of the two double bonds in the furan nucleus of the bifunctional derivatives.

The $NF_2$ adducts of the monofunctional furan derivatives, which can be readily made under subatmospheric pressures, are subject matter of another United States application Serial No. 77,462 filed Dec. 21, 1960, by A. J. Passannante et al.

The bifunctional and monofunctional derivatives of furan react with $N_2F_4$ by using conditions which in general apply to the reaction of furan as set forth in U.S. application Serial No. 77,471, filed Dec. 21, 1960, now abandoned, by P. A. Argabright but more particularly the bifunctional derivatives react better with $N_2F_4$ under higher pressures of $N_2F_4$.

To obtain desired addition of 2 mols of $N_2F_4$ per mol of bifunctional furan, increased reaction pressure and use of a suitable solvent, such as $CCl_4$, are effective factors to rely upon rather than increased temperatures. The reaction pressures used may be in the range of about 100 to 3,000 pounds per square inch absolute. The solvent may be used in a proportion of 5 to 30 parts by weight per part by weight of the bifunctional furan reactant. Suitable reaction temperatures are in the range of about 100° C. to 350° C. but preferably 100° to 200° C. The time of reaction is a variable depending on reactivity, the conditions of reaction, and desired amount of reaction.

The following equation represents the reaction of converting 2,5-dicarbomethoxy furan (III) to the tetrakis —$NF_2$ adduct (I).

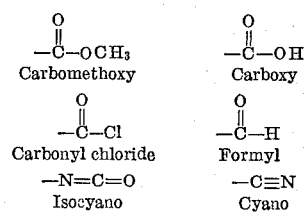
(III)

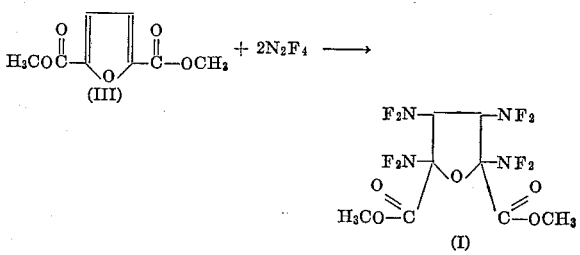
(I)

Reaction conditions for addition of the $N_2F_4$ to the bifunctional furan are described in the following examples:

Example 1

A stainless steel autoclave was charged with dicarbomethoxy furan as starting material reactant. In using a solvent, 5 g. $CCl_4$/g. starting material was charged. $N_2F_4$ was charged to the autoclave in excess of 2 mols per mol of the disubstituted furan reactant. The charge maintained under pressure was heated to reaction temperatures of 150° and 180° C. The product after periods of reaction was analyzed for fluorine (F) content.

Data on a series of runs carried out by the method of Example 1 are summarized in the following table:

TABLE 1.—REACTION OF $N_2F_4$ WITH DICARBOMETHOXY FURAN

| Run No. | Temp., °C. | Time, hrs. | Pressure, p.s.i.a. | Solvent | Product, Percent F |
|---|---|---|---|---|---|
| 1 | 180 | 19 | 350 | None | None |
| 2 | 150 | 6 | 450 | Yes | 14.1 |
| 3 | 150 | 12 | 450 | Yes | 33.0 |
| 4 | 150 | 19 | 450 | Yes | 37.9 |

In Run 4, the percentage nitrogen (N) was found to be 15.9.

In Runs 1, 2 and 3, unreacted material (III) was isolated and determined quantitatively by ultra-violet spectroscopy. In Run 4, less than 5% unreacted starting material remained.

The tetrakis —$NF_2$ product (I) is a viscous, colorless oil. The analysis (F and N) agrees closely with percent F and N calculated for (I) (Theory: F, 38.8; N, 14.28).

The molecular weight of the oily product of Run 4 was found to be 400 as compared to 392 theory for (I). The infra red spectrum and the nuclear magnetic resonance spectrum of the product are consistent with structure (I). Therefore, the product from Run 4 is the tetrakis $NF_2$ adduct (I).

The tetrakis $NF_2$ derivative (I) contains a high $NF_2/C$ ratio of 1:2 which gives it high oxidizing action when used in a composite.

The tetrakis NF$_2$ derivative (I) is capable of reaction with hydroxyl groups in polymers and of condensation polymerization for producing oxidizer binders, as in the following kind of reaction:

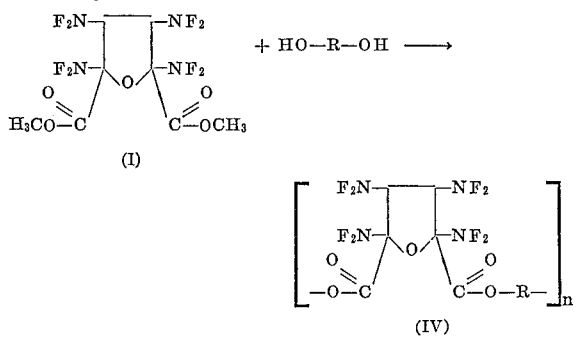

Wherein R represents a hydrocarbon group and subscript $n$ indicates a repeated polyester unit (IV).

*Example II*

In a manner similar to that in Example I, a multi NF$_2$ adduct containing at least one NF$_2$ group per C in the furan ring is formed by reacting a dicarboxy acid or dicarbonyl chloride of furan, e.g., diacid chloride of furan dicarboxylic acid, V. High F-containing adduct II is obtained by carrying out the following reaction at 450 p.s.i.a., 150° C., with CCl$_4$ solvent for 7 to 19 hours.

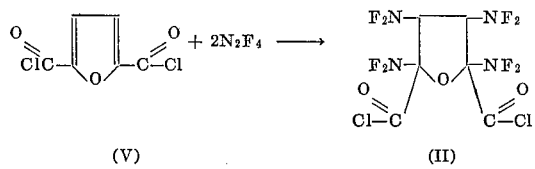

The N$_2$F$_4$ adduct was found to contain from 41 to 46% F indicating that some substitution of F for Cl accompanied the addition reaction.

The adduct II is an oxidizer and like adduct I is capable of reacting with OH groups of polymers or with polyols, certain amino alcohols or certain diamines to form polyester oxidizer binders containing an ester or amide linkage.

Other NF$_2$ adducts of disubstituted furans are represented by diisocyanate, dicarboxylic acid, dicarbonitrile, and dicarboxaldehyde compounds, and in these the functional groups are kept intact for cross-linking condensation or polymerization condensation while they are endowed with NF$_2$ groups attached to carbon atoms in the furan nucleus.

The dinitrile can be reacted with dicarboxylic acids to form polyimides.

With two of the isocyanate groups present as substituents, reaction of the NF$_2$ adduct of the bifunctional furan with a dihydric alcohol or polyol containing 2 or more hydroxy groups takes place as follows:

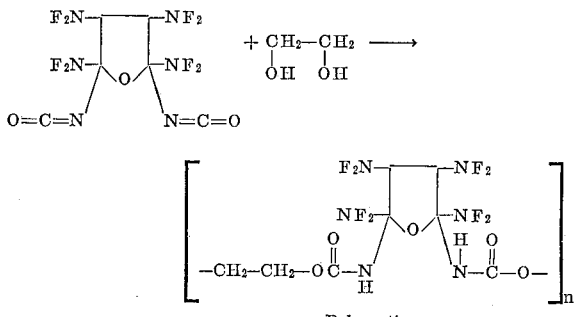

Polyurethane

The formation of polyurethane —NF$_2$ adducts takes place as described in U.S. application Serial No. 77,463 filed December 21, 1960 by A. J. Passannante.

A satisfactory technique for reacting the NF$_2$ adducts of furan disubstituted by isocyanante groups with polyols, e.g. polyvinyl alcohol, makes use of solvents such as nitrobenzene, dimethyl formamide, acetonitrile, and tetrahydrofuran. With these solvents the reaction is carried out at temperatures of about 25° C. to 100° C. in about 1 to 20 hours. The proportion of the disubstituted furan —NF$_2$ adduct used depends on the number OH groups in the polyol to be reacted.

Formulation studies have shown that the NF$_2$ adducts of the bifunctional furans containing at least 4NF$_2$ groups in the molecule and 6 to 8 carbon atoms have a sufficiently high energy value to make them useful in composites required to give a specific impulse performance in the range of 250 to 290 reciprocal seconds. They can thus be used with powdered metals such as B, Al, Be, Mg and B. The composites may contain oxygen oxidizers, such as, NH$_4$ClO$_4$ and other NF$_2$ oxidizers.

Although the usually available bifunctional furans have the functional group in the 2,5 positions, various positional isomers thereof may be reacted to obtain the NF$_2$ adducts, as indicated by the following formulae, in which X represents the functional group:

Where the two X groups can be situated in any number of positions so as to give all of the position isomers, i.e. 2,5-; 2,3-; 2,4-; 3,4-; 3,5- (cis or transforms).

What is claimed is:
1. Tetrakis (NF$_2$) adduct of dicarbomethoxy furan.
2. Tetrakis NF$_2$ adduct of furan diisocyanate.
3. Tetrakis NF$_2$ adduct of the diacid halide of furan 2,5-dicarboxylic acid.
4. Tetrakis NF$_2$ adduct of furan dicarboxylic acid.
5. Tetrakis NF$_2$ adduct of furan dicarboxaldehyde.
6. Tetrakis NF$_2$ adduct of furan dinitrile.
7. Process of preparing the tetrakis (NF$_2$) adduct of a bi-functional furan derivative in which each of two functional substituent groups linked to each of two carbon atoms in the furan nucleus is capable of condensation reaction and is selected from the group consisting of carbomethoxy, carboxy, carbonyl chloride, formyl, isocyano and cyano functions, which comprises, reacting said befunctional furan derivative with N$_2$F$_4$ in a proportion of at least twice the molar proportion of said derivative at about 100° to 200° C. under superatmospheric pressure in the presence of a solvent, and recovering as product a tetrakis (NF$_2$) adduct of the bifunctional furan derivative.
8. The process of claim 7 in which the bi-functional furan derivative is reacted with N$_2$F$_4$ in CCl$_4$ as the solvent at about 150° C. under a superatmospheric pressure of about 450 p.s.i.a.
9. A bi-functional furan adduct of NF$_2$ having the formula:

wherein each X represents a functional group substituted for a hydrogen atom in a furan nucleus, both functional groups thus substituted being the same and selected from the group consisting of carbomethoxy, carboxy, carbonyl chloride, formyl, isocyano and cyano.

No references cited.

NICHOLAS S. RIZZO, *Primary Examiner.*

R. L. CAMPBELL, L. D. ROSDOL, *Examiners.*

J. W. WHISLER, *Assistant Examiner.*